No. 778,277. Patented December 27, 1904.

UNITED STATES PATENT OFFICE.

CARL FRIEDERICH SCHAERGES, OF BASEL, SWITZERLAND, ASSIGNOR TO THE FIRM OF F. HOFFMANN-LAROCHE, OF BASEL, SWITZERLAND.

CHLORAL-ACETONE-CHLOROFORM AND PROCESS OF MAKING SAME.

SPECIFICATION forming part of Letters Patent No. 778,277, dated December 27, 1904.

Application filed May 20, 1904. Serial No. 208,916.

*To all whom it may concern:*

Be it known that I, CARL FRIEDERICH SCHAERGES, chemist, a citizen of the German Empire, residing at Basel, Switzerland, (whose post-office address is Karthausgasse 7, Basel, Switzerland,) have invented a certain new and useful Process for the Manufacture of a Pharmaceutical Compound, (for which I have applied for a patent in Germany on the 3d day of July, 1903,) of which the following is a specification.

Acetone-chloroform, which was first produced by C. Willgerodt, (as reported in the *Ber. d. Deut. Chem. Ges.*, XIV, 2451,) has been recognized by Kossa and subsequently by V. Vamossy as a compound possessing hypnotic and local anesthetic properties, (*Deutsche Medic. Wochenschrift*, 1897, No. 36;) but its more extensive application for medicinal purposes has been impeded by its insolubility in water and strongly-diluted alcohol and also by its pungent taste. I have found, however, that chloral hydrate or chloral combines with acetone-chloroform in molecular proportions, thereby forming a product of condensation which is soluble in one hundred times its own weight of cold water and very easily soluble in dilute alcohol. It possesses the pharmaco-dynamic properties of its components, and its taste is not pungent, but mild and resembling that of camphor.

The chemical constitution of chloral-acetone-chloroform may be represented by the formula:

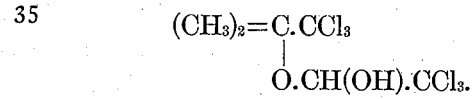

The details of procedure for its manufacture will appear from the following examples:

Example 1: 16.55 parts (by weight) of chloral hydrate are fused together with 17.75 parts of liquid acetone-chloroform (*Journ. Prakl. Chemie*, 2, 37.361) or with 18.65 parts of crystallized acetone-chloroform and maintained at a temperature of 75° to 80° centigrade for about half an hour. The chemical reaction may be represented by the following equation:

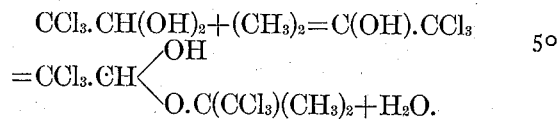

The solidified product of the reaction is dissolved in twice its weight of benzene (or in a corresponding quantity of ether, alcohol, benzin, or other suitable solvent) at a high temperature. On cooling the chloral-acetone-chloroform crystallizes out in the shape of fine needles resembling asbestos. By recrystallizing the product out of benzene it may be obtained in a chemically-pure condition with constant melting-point.

Example 2: 14.75 parts of chloral are mixed together with 17.75 parts of liquid or 18.65 parts of crystallized acetone-chloroform, thereby causing the said materials to act upon each other and to gradually form a solid product while giving off heat. In order to finish the chemical reaction, the product is heated on a steam-bath to a temperature not exceeding 75° centigrade for about half an hour. The solidified product of the reaction is purified by recrystallization, as in the first example. The chemical reaction may be represented by the following example:

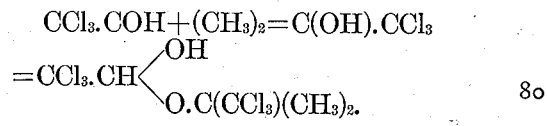

Chloral-acetone-chloroform melts at 65° centigrade and has a slight smell and taste resembling that of camphor. Sulfuric acid splits it up into chloral and acetone-chloroform already in the cold.

An aqueous solution of the new compound will reduce a permanganate solution, but only on boiling. Cautious heating causes sublimation of the compound. When heated more strongly, it ignites and burns without a residue.

The new compound or preparation is a very promptly-acting hypnotic, and it is capable of producing local anesthesia. It does not produce painful irritation, as is the case with chloral, nor does it act as a blood-poison, as does chloral hydrate, when administered repeatedly for a considerable length of time. Its hynotic action is much more intense than that of chloral. After the use of chloral-acetone-chloroform the blood-pressure seems to be altered less than after the use of chloral and the respiration remains intact.

What I claim is—

1. The process for the production of chloral-acetone-chloroform, which consists in mixing chloral hydrate together with acetone-chloroform in molecular proportions and heating, substantially as described.

2. The process for the production of chloral-acetone-chloroform, which consists in mixing chloral hydrate together with acetone-chloroform in molecular proportions, heating to complete the reaction, dissolving the solid product in a suitable solvent at a high temperature and allowing it to crystallize out, substantially as described.

3. As a new product of manufacture, chloral-acetone-chloroform $C_6H_8O_2Cl_6$, capable of forming crystals melting at 65° centigrade, the said product having a faint odor and taste resembling camphor, being sparingly soluble in cold water, very soluble in dilute alcohol, capable of sublimation by cautious heating, capable of being split up by sulfuric acid into chloral and acetone-chloroform in the cold, capable of reducing permanganate solution on heating, and obtainable by the process described above.

In witness whereof I have signed this specification in the presence of two subscribing witnesses.

CARL FRIEDERICH SCHAERGES.

Witnesses:
   GEO. GIFFORD,
   ALBERT GRAETER.